United States Patent [19]

Dierikx, deceased et al.

[11] Patent Number: 5,285,951
[45] Date of Patent: * Feb. 15, 1994

[54] GATE VALVES AND METHODS OF CONNECTING SAME

[75] Inventors: Andreas P. A. Dierikx, deceased, late of Bergen Op Zoom; by Johannes Kranenburg, legal representative; Arthur A. J. M. Van Hooijdonk, both of Roosendaal, all of Netherlands

[73] Assignee: R.M.I. Holland B.V., Netherlands

[*] Notice: The portion of the term of this patent subsequent to Nov. 27, 2007 has been disclaimed.

[21] Appl. No.: 829,283

[22] Filed: Feb. 3, 1992

Related U.S. Application Data

[60] Continuation-in-part of Ser. No. 554,914, Jul. 20, 1990, Pat. No. 5,085,403, which is a division of Ser. No. 282,581, Dec. 12, 1988, Pat. No. 4,972,577.

[51] Int. Cl.$^5$ .............................................. B23K 31/00
[52] U.S. Cl. ................................. 228/214; 29/890.131
[58] Field of Search ............. 29/157.1 R, 463, 890.09, 29/890.121, 890.131; 251/327, 367; 228/214

[56] References Cited

U.S. PATENT DOCUMENTS

4,235,003 11/1980 Gachot .......................... 29/157.1 R
4,972,577 11/1990 Dierikx ........................... 29/890.09

FOREIGN PATENT DOCUMENTS

919152 1/1973 Canada ........................... 29/57.1 R
819475 4/1981 U.S.S.R. ......................... 29/157.1 R Primary Examiner—Paula A. Bradley
Assistant Examiner—Jeanne M. Elpel
Attorney, Agent, or Firm—Watson, Cole, Grindle & Watson

[57] ABSTRACT

A method of connecting pipes to a gate valve assembly includes the steps of turning a wedge-shaped valve member having a heat sensitive sealing disc to a fully open position so that the disc is further away from a weld seam than when the disc is in a closed position. A pipe is then sealed to the gate valve assembly while the heat sensitive sealing disc is in the open position. Heat from the sealing operation is thus prevented from damaging the heat sensitive sealing disc.

8 Claims, 4 Drawing Sheets

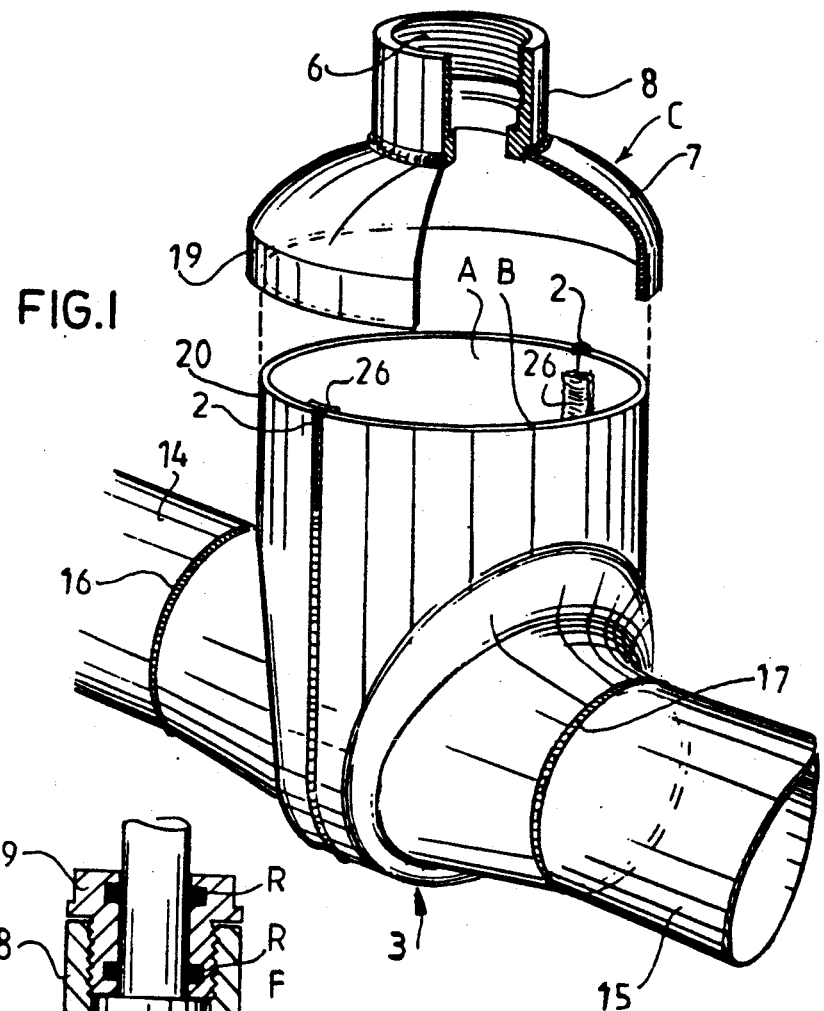
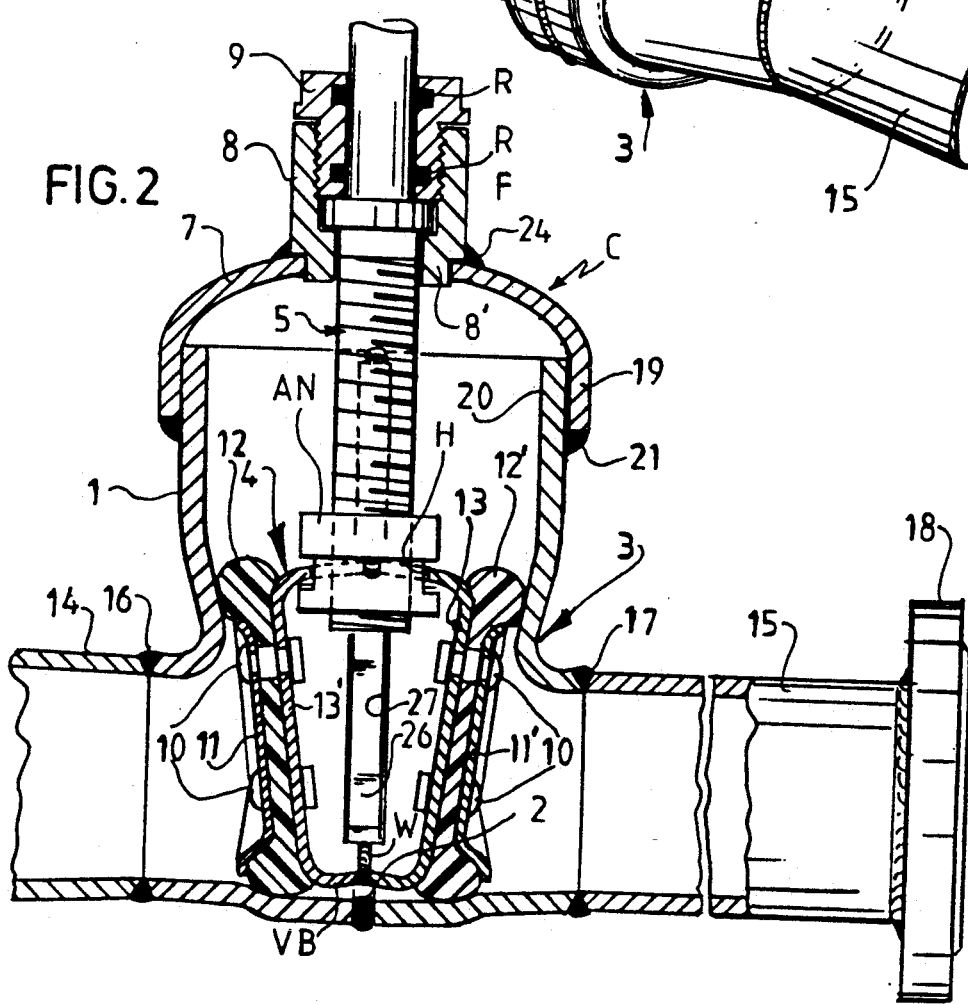

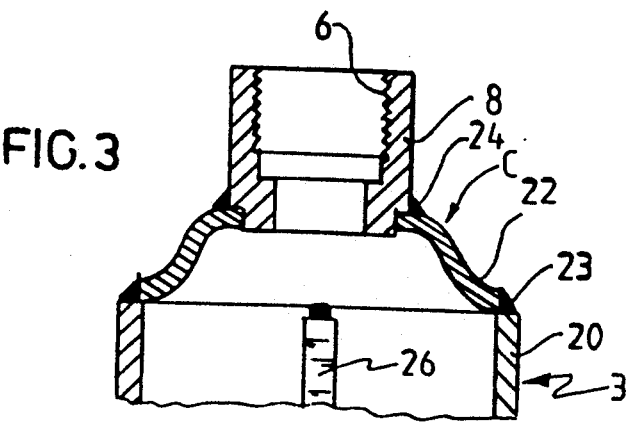

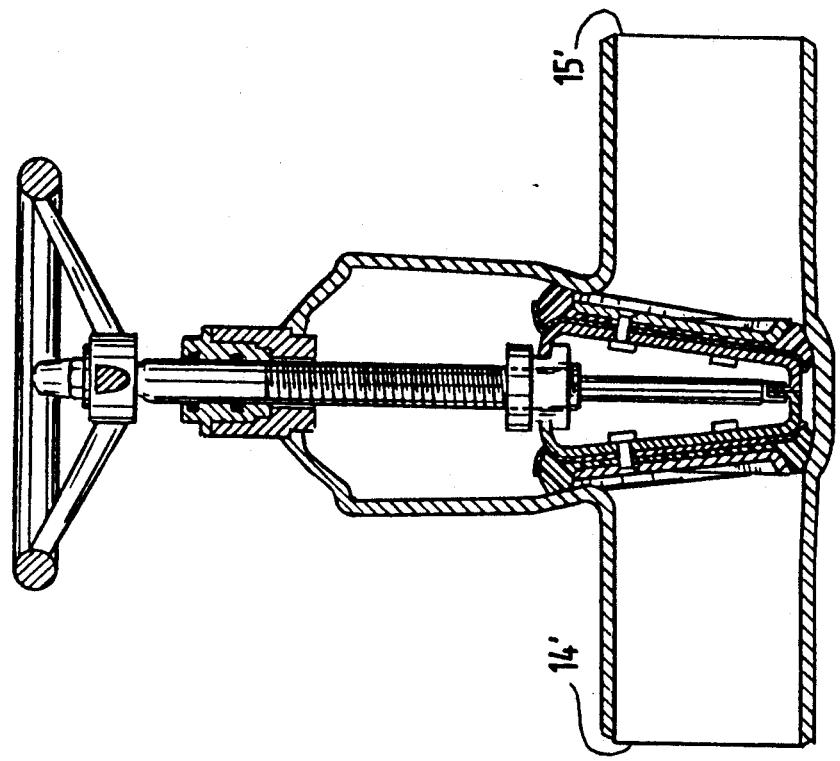
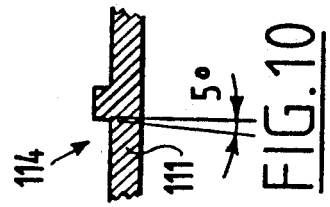
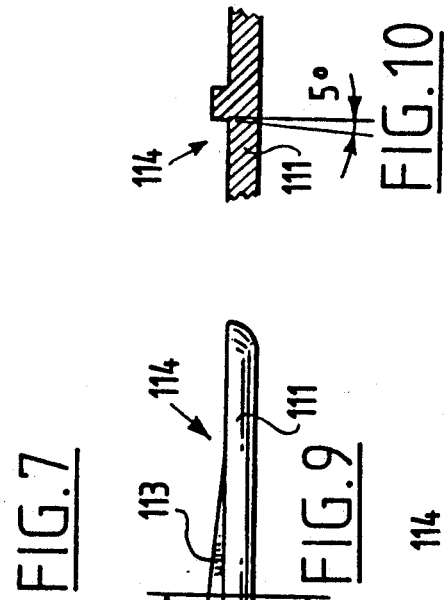
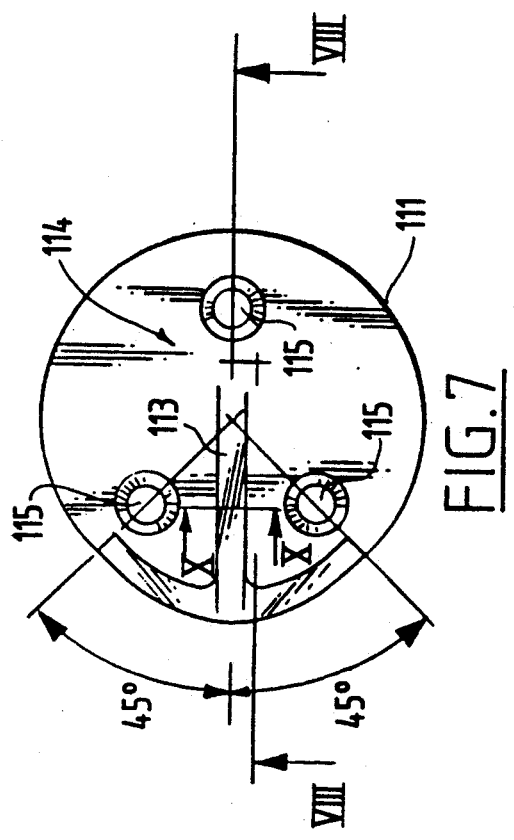
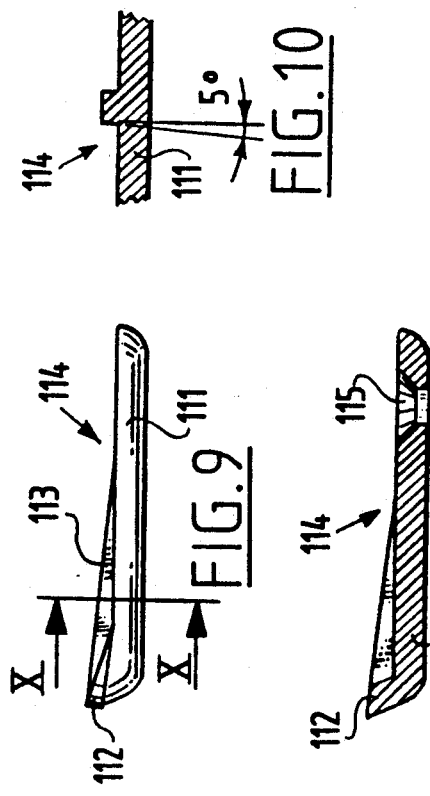

GATE VALVES AND METHODS OF CONNECTING SAME

This is a Continuation-in-Part of application Ser. No. 554,914, now U.S. Pat. No. 5,085,403, filed Jul. 20, 1990 which in turn is a Division of Application Ser. No. 282,581 now U.S. Pat. No. 4,972,577 filed Dec. 12, 1988.

BACKGROUND AND BRIEF SUMMARY OF THE INVENTION

This invention relates to the economical manufacture of a welded gate valve assembly in which component parts thereof are made of stamped metal. The economy of manufacture and the sealing effect of the invention are so great that it is possible to provide a gate valve assembly which may be placed in service for a long time and, when its useful life is at an end, simply thrown away and replaced by a similar economical gate valve assembly. The gate valve assembly of this invention is characterized in that component parts thereof are fabricated economically as stamped metal parts; and that these component parts are welded together to form the completed gate valve assembly. In Canadian patent 919152, assigned in common herewith, welding is used during the manufacture of the gate valve assembly and in particular in conjunction with the gate valve body and may also be used to weld casing halves together. A separate cover assembly, secured in place by nuts and studs, however, is taught inasmuch as this is necessary for manufacturing purposes. The Russian patent 819 475 of 04/81 teaches the manufacture of a gate valve assembly from component parts which are of stamped or pressed steel form and are welded together. The component parts, however, are of extremely complex form and there are many of them, with the result that the economy of manufacture suffers.

The gate valve assembly of this invention forms a very efficient seal and, to this end, it incorporates a wedge-shaped valve body assembly having resilient valve-seating elements which are made of such material as to be sensitive to destruction or detrimental effect from excess heat during manufacture of the gate valve of this invention. The valve body itself is formed of two stamped metal halves which are welded together and the valve body assembly is completed by sandwiching a heat-sensitive resilient disc between each side of the valve body and a circular plate, the plate in each case being riveted to the respective valve body side after the valve body has cooled from welding so that the heat-sensitive material is not damaged. Unfortunately, if such a valve body assembly is used, the heat-sensitive valve-seating elements thereof cannot be subjected too close to a weld seam being formed while in a closed welding environment during manufacture of the valve assembly. Hence the use of the separate and removable cover assembly of the noted Canadian patent 919152 which teaches the introduction of the heat-sensitive material (when used) into the interior of the casing subsequent to any welding operation. The Russian patent does not disclose the use of a valve body assembly employing vulnerable valve-seating elements and hence teaches nothing concerning protection thereof.

The necessity for the aforesaid protection of the heat-sensitive valve-seating elements arises by reason of the fact that at some point in the manufacture of the gate valve assembly, the valve body assembly to which the heat-sensitive elements are sandwiched must be confined within an enclosed environment defined by the casing and the cover components of the gate valve assembly, whereupon welding between components must be carried out which could easily cause such heat build-up within that environment as to damage the heat-sensitive elements if the weld seam passes in too close proximity to the heat-sensitive elements. In addition, there will be at least some metal-to-metal contact between the valve body assembly and other components during a final welding step of manufacture which could effect direct heat transfer to the heat-sensitive elements and thereby augment the possibility of damage due to the heat build-up Thus, in any embodiment of the invention where the likelihood of such damage is present, the manufacturing technique of this invention makes it possible to reposition or move the heat-sensitive elements during final welding to alter or change the proximity of the valve body assembly relative to the weld seam.

Accordingly, a primary object of the invention is to protect the heat-sensitive elements of a valve body assembly from damage during manufacture wherein stamped metal components are welded together to effect the final assembly.

It is of primary concern in connection with this invention to provide a method of manufacturing a gate valve assembly comprised substantially wholly of stamped steel components which are few in number and which lend themselves to simple and economical steps of manufacture and wherein heat-sensitive elements are also used which are protected from damage during manufacture. In association with the method, the sequence of steps employed which includes the use of a special fixture for locating the components for welding, is such as to protect the heat-sensitive elements to a maximum degree.

An object of this invention concerns the method of making a gate valve assembly which comprises the steps of: mating two stamped metal valve body halves while capturing an actuating nut between the mated halves; welding the mated valve body halves together to provide a wedge-shaped metal valve body with actuating nut captured therebetween; placing heat-sensitive resilient discs against converging opposite sides of the wedge-shaped metal valve body and mechanically sandwiching such heat-sensitive resilient discs against opposite sides of the metal wedge-shaped valve body to leave circumferential margins of the heat-sensitive resilient discs exposed for sealing purposes to provide a valve body assembly with actuating member captured thereby; inverting the valve body assembly and confining it within a closed environment defined by stamped metal components which, when welded together with the valve body assembly therewithin form a completed gate valve assembly, while supporting and locating the valve body assembly while in minimal contact with the stamped metal components; and then welding the confining stamped metal components together to provide a completed gate valve assembly.

It is preferred that the confining stamped metal components comprise a stamped metal cover to which an actuating spindle sleeve has been welded for receiving the actuating spindle cooperating with the actuating nut, and stamped metal halves forming casing components. The fixture of this invention holds the cover in inverted position with the actuating spindle and actuating nut engaged to support and locate the inverted valve body assembly on the inverted cover and to allow the casing halves to be mated and welded and then to be placed while inverted to surround the inverted valve body assembly in guiding relation thereto and located relative to the inverted cover for final welding.

DESCRIPTION OF THE DRAWING FIGURES

FIG. 1 an exploded perspective view of certain components according to one embodiment of this invention;

FIG. 2 is a vertical section taken through a completed gate valve assembly according to the embodiment of FIG. 1;

FIG. 3 is a partial section taken through a slightly modified embodiment of the invention;

FIG. 6 is a partial vertical section taken through the fixture of FIG. 4 but orthogonal to the section of FIG. 5;

FIG. 7 is a perspective view of a cupped plate for use in accordance with the valves of the present invention;

FIG. 8 is a cross-sectional view taken along line 8 of FIG. 7;

FIG. 9 is a side view of the cupped disc shown in FIG. 7;

FIG. 10 is a cross-sectional view taken along line 10 of FIG. 9; and

FIG. 11 is a cross-sectional view of an alternative embodiment of a gate valve according to the present invention.

DETAILED DESCRIPTION

Figure 4:
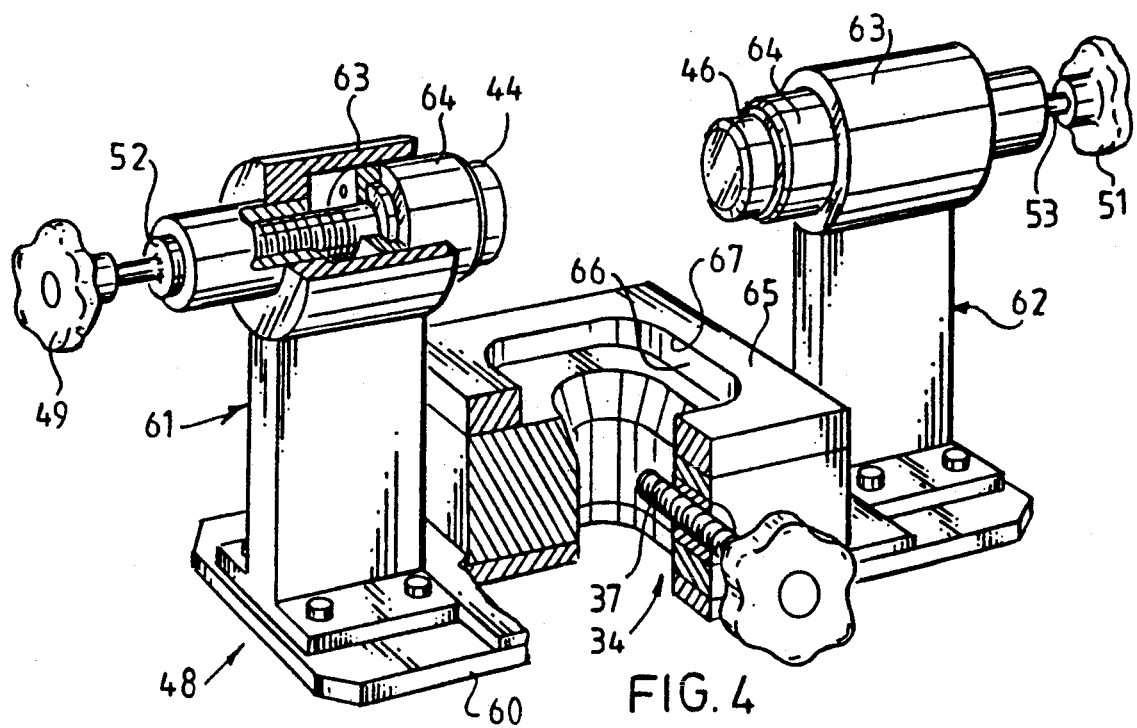
FIG. 4 is a perspective view of a preferred embodiment of an apparatus or fixture for manufacturing a gate valve assembly from the components of this invention illustrated in FIGS. 1 and 2.

As noted, the manufacturing steps according to this invention are sequenced to provide maximum protection from heat damage of heat-sensitive sealing elements thereof. These heat-sensitive elements are part of the valve body assembly which, itself incorporates stamped metal components which are welded together. The valve body assembly is designated by the reference character 4 in FIG. 2. It comprises the two identically shaped stamped metal halves 13 and 13' which are welded together along the weld seam W. The halves 13 and 13' are notched at opposite sides so that a guide slot S is provided at each side of the wedge-shaped valve body VB formed by the welded-together halves 13, 13'. These slots receive guide strips 26 which are welded to the inner side surfaces 20 of the casing halves A and B when those halves are joined as described below by the weld seam 2. However, when the casing halves 13, 13' are mated, additional notches (preferably rectangular) in the two halves form a rectangular hole H at the top of the wedge-shaped valve body which captures the actuating nut AN between the halves 13, 13' in non-rotatable fashion. This structure is disclosed in the Canadian patent 919152 mentioned above. As one step in the manufacturing process according to this invention, the stamped metal halves 13, 13' are mated with the actuating nut captured therebetween and are welded together. Subsequent to this and after the valve body VB has cooled sufficiently, the resilient sealing discs 12, 12' are sandwiched against the outer convergent faces of the body VB. These faces as well as the cupped plates 11, 11' and the discs 12, 12' themselves are provided with openings or holes to receive the "blind" rivets 10 to effect mechanical attachment of the plates 11, 11' and the sandwiched discs 12, 12' to the valve body VB and expose the peripheral margins of the discs for sealing purposes, as is clearly shown in FIG. 2.

In place of the "blind" rivets 10, the cupped plates 11, 11' may be bolted to the sandwiched discs 12, 12' and to the valve body VB much like the arrangement shown in FIG. 2. The material from which the cupped plates 11, 11' are made may include metals, particularly cast iron, for handling high pressures. The cupped discs may also be provided with a protruding edge for retaining the discs 12, 12' under high pressures such as 40 bar and above. One embodiment of the additional edge is more clearly shown and described with reference to FIGS. 7-10.

The material from which the discs are made may be chosen as desired but normally will be an elastomeric material having sufficient resiliency as to function as a sealing material and which is heat-sensitive. The use of stamped metal components virtually assures that there will be rough or uneven surface portions of the casing 3 with which the elements 12, 12' are forced into engagement as requires the resiliency to effect a proper seal. In this respect, the gate valve assemblies of this invention are usable under conditions which necessitate a gas-tight seal every time the valve is shut off and in this respect, the gate valve assemblies of this invention are remarkably effective. This is an important consideration for longevity and the gate valve assemblies of this invention are so effective and cost-effective in this respect that a gate valve assembly which has reached the end of its useful life may be discarded and simply replaced by a new valve.

The casing indicated generally by the reference character 3 is generally cylindrical in shape and formed of two identical halves A and B, each of stamped metal form. Each half A and B is provided with a side edge face and these two side edge faces ultimately are mated in opposition and the weld seam 2 is effected to join them. The tops of the halves A and B are orthogonal with respect to the side edge faces and present semicircular faces circumscribing the open top of the casing 3 and define a cylindrical margin which is mated with the stamped metal cover C, particularly by being received within the peripheral cylindrical flange 19 thereof. As will later be described, the cover C is joined to the casing 3 along the weld seam 21. The dome or top 7 of the cover C presents a circular opening which receives the cylindrical stub 8' of the metal sleeve 8 which is provided with internal threads 6 as shown, and the sleeve 8 is joined to the cover C along the weld seam 24.

The internally threaded sleeve 8 receives the gland nut 9 which carries the sealing rings R and its length is such as to leave an annular gap between the sleeve 8 and nut 9 which receives the circular stop flange portion of the spindle or stem 5 to prevent axial displacement of the spindle relative to the cover C. Preferably, two sealing rings R are disposed between the spindle 32 (FIGS. 5 and 6) and the gland nut 9. The threaded portion of the spindle 5 is engaged in the actuating nut AN and rotation of the spindle by, for example, a conventional hand wheel (not shown) attached to the exposed upper end of the spindle causes the nut AN to ride up or down on the threaded portion of the spindle and carry the guided valve body assembly with it to unseat from or seat on the inner surface of the casing 3. As will be seen, the interior of the valve body VB is hollow so that the nut AN may ride up and down to the full extent necessary fully to open and to close the valve structure.

The metallic tube portions 14 and 15 with flanges 18 can be weld the casing at 16 and 17 respectively, as a final step in the process, but may also be effected before the gate member 4 is installed within the casing.

In another embodiment of the gate valve according to the invention (FIG. 3) there is a wall portion 22 of the cover C resting on a wall portion 20 of the casing 3 and joined along the weld seam 23. In this embodiment, less material is needed for the cover, but nevertheless this arrangement is still possible, although this makes the alignment of the cover relative to the casing before welding more difficult.

The gate valve according to the invention is very versatile, because for each application this gate valve can easily be provided with different tube portions 14, 15 welded to the casing of the present gate valve. Also because of the light weight of the gate valve, it can even be incorporated into a conduit or line of synthetic material without the use of welded tubes 14, 15 which may, in this instance, be replaced by synthetic material tubes and/or flanges for easy incorporation into the conduit or line.

For high flow applications, the gate valve, tube portions 14, 15 and flange 18 (if used) can be made large enough to connect with wide pipes having diameters of e.g., 8, 10 and 12 inches.

In one embodiment according to the present invention, no flange is used at the end of tubes 14 and 15. This embodiment is shown in FIG. 11 wherein the ends of tubes 14' and 15' have no flange. In this case, the valves can be welded directly into a piping system. According to the present invention, the material of the stamped metal is preferably substantially the same material as that of the pies which are to be welded thereto. Thorough and integral welding to form a tight connection is thus facilitated. In accordance with a method of the present invention for connecting the gate valves to pipes, the wedge shaped valve member which comprises both sealing discs is turned to the fully open position. In so doing, the heat generated by welding does not seep through and damage the non-metallic parts, such as the resilient sealing discs 12, 12'. This method of welding pipes to the gates valves has many advantages. The method may also be practiced on valves having only one or at least one heat sensitive sealing disc. Due to the light weight of the stamped metal valves and the method of the invention, the valves can be installed and suspended from existing pipe systems without the need to take apart the existing system.

In some embodiments, only one end of the valve is provided with a flange. The two different tube portions 14 and 15 need not be identical. In some cases, the valves may have one tube adapted to tap mild steel gas mains by direct welding with one end of the gas main, while the other tube of the valve may be adapted to be connected to a standard drilling apparatus.

The valves according to the present invention can also be used in hard polyvinyl chloride and other plastic piping systems due to their light weight. The valves are so light that they may even be suspended from an existing plastic piping system. For these applications, the valve interiors may be coated with the same or a different material as that of the pipes. To connect plastic pipes to the gate valves, the valve tubes may be press fit or clasped onto the pipes, or vice versa, without using heat for bonding.

The valves of the present invention are also well suited for fitting in confined spaces. The annular protrusions of the valve body conform with most standards.

FIGS. 7-10 show various views and cross-sections of a preferred cupped plate for use in the gate valves of the present invention. The cup 111 is provided with a protruding edge portion 112 which is raised with respect to the normal plane of the inner cup face 114. A support section 113 is also raised with respect to the normal plane of the inner cup face 114. Three holes 115 are provided to receive bolts or rivets which hold the discs 12 and 12' (FIG. 2) against the valve body 4. As can be seen in FIGS. 7 and 8, the holes 115 maybe tapered to receive a tapered heat of a bolt or rivet.

Figure 5:
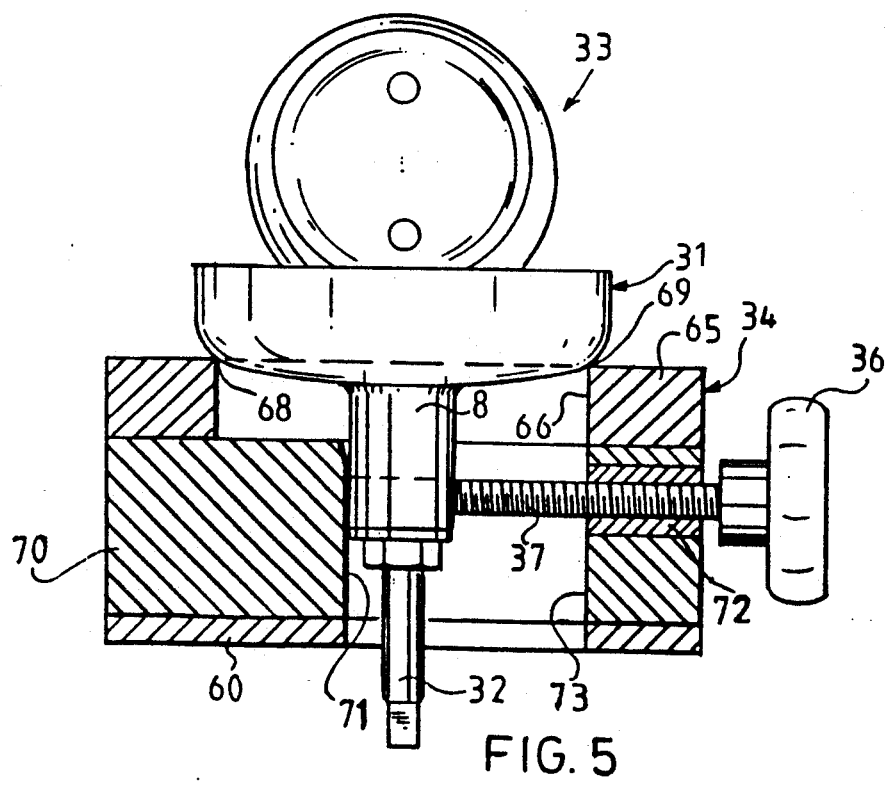
FIG. 5 is a vertical section taken through the fixture of FIG. 4.

A preferred embodiment of a fixture for performing some of the method steps in conjunction with the embodiment of the invention illustrated in FIGS. 1 and 2 is illustrated in FIGS. 4-6. This fixture includes the support or base plate 60 upon which the two pedestals 61 and 62 are secured. Each pedestal includes a housing 63 in the form of a barrel providing a cylindrical bore which slidably receives a piston member 64 having a reduced diameter end portion 44 or 46 which are disposed in horizontal alignment and dimensioned to be received in the openings of the arms 39 and 41 of the casing 3. The externally threaded spindle portions 52 terminate in reduced diameter ends 53 having respective hand wheels 49 and 51 by means of which the plungers 64 may be individually moved toward and away from each other to enter their end portions into the respective arms 39 and 41 and to seat against their ends and thus clamp the halves A and B together. At this point, any suitable welding apparatus may be used to effect the weld seam 42 and, at the same time to weld the guide strips 43 in place. The thus completed casing assembly 38 may then be removed from between the clamping pedestals. In a separate jig or fixture, the cover 31 may be aligned with and then welded to the sleeve 8 and the spindle 32 engaged with the actuating nut AN to form a unit of the cover 31, sleeve 8, spindle 32, actuating nut AN and assembly 33. This unit is then inverted and placed upon the platform 34. The platform 34 includes the upper block 65 having the opening or recess 66 presenting a planar supporting edge 67 upon which the cover is placed so that it rests upon the edge 67 at four different points, two of which are indicated at 68 and 69 in FIG. 5. The bottom block portion 70 of the platform 34 is provided with an offset slot or recess 73 opening into the opening 34 in the base 60 and which presents the stop surface 71. Opposite this stop surface, the portion 70 is provided with the internally threaded sleeve 72 which receives the clamping screw 37 provided with the hand wheel 36. By turning the wheel 36, the screw 37 may be advanced to engage the sleeve 8 and force it against the stop surface 71 and thus rigidly clamp the aforesaid unit firmly in place with minimal if any shifting of the unit from its initially centered relation of rest on the supporting points 68, 69, etc. which may occur because the component parts are formed as stampings and cannot be assured of extreme accuracy at manufacture. However, by now placing the previously welded casing assembly once again in inverted position while lowering it carefully around the aforesaid inverted unit so that the slots S in the valve body receive the guide strips 43 proper orientation of all components is facilitated. The inverted open top of the casing 3 will then be entered into the peripheral flange 19. The clamping plungers 64 may then be manipulated to accurately align the components and when this is done, the final weld 47 may be effected. It will be noted that the distance D is chosen such that the casing top is not bottomed in the cover 31 so as easily to allow a certain amount of shifting and adjusting of the wheels 49 and 51 as well as the wheel 36 to permit accurate alignment of the parts so that operation of the spindle 32 will smoothly raise and lower the valve body assembly 33 without binding. The significance and value of the resilient sealing elements is once again demonstrated for they not only assure a gas-tight seal, but also accommodate for slight misalignments which would otherwise defeat such sealing.

In considering this invention, the above disclosure is intended to be illustrative only and the scope and coverage of the invention should be construed and determined by the following claims.

What is claimed is:

1. A method of connecting pipes to a gate valve assembly, said gate valve assembly comprising:
    a stamped metal housing having two openings; and
    a valve member comprising at least one resilient, heat sensitive sealing disc, said sealing disc movable within said housing between an open position to allow a flow of fluid through the valve, and a closed position to prevent a flow of fluid through the valve,
said method comprising:
    turning the valve member comprising said at least one sealing disc to said fully open position within said housing such that said disc is at a position which is further away from said openings than when said at least one sealing disc is in said closed position; and
    heat sealing a pipe to at least one of said openings.

2. A method as in claim 1, wherein said pipe comprises metal and said heat sealing comprises welding.

3. A method of connecting a pipe to a gate valve, said gate valve comprising two dish-shaped metal casing halves defining a gate member and welded in mating relation, an actuating nut captured between the mated and welded gate halves, a wedge-shaped valve member comprising a pair of resilient, heat sensitive sealing discs, and a pair of plates secured to respective gate member halves and sandwiching the respective sealing discs thereto, a pair of stamped metal casing halves which are mated and welded together to define a guide track for said actuating nut, a threaded stem secured to one end of said actuating nut and projecting from said gate member parallel to said guide track, and a stamped metal cover welded to said casing and defining a substantially closed space therewith receiving said gate member,
    said heat sensitive sealing discs movable to define an open position to allow a flow of fluid through said valve and a closed position to prevent a flow of fluid through said valve,
    said method comprising:
    turning the wedge-shaped valve member comprising both sealing discs to said fully open position such that said discs are at a position which is further away from said at least one opening within said mated and welded stamped metal casing halves than when said discs are in said closed position; and
    sealing a pipe to said at least one opening within said mated and welded stamped metal casing halves while said heat sensitive sealing discs are in said open position.

4. A method as in claim 3, wherein said pipe is plastic and said sealing comprises clamping.

5. A method as in claim 3, wherein said pipe is plastic and said sealing comprises pressing.

6. A method as in claim 3, wherein said resilient, heat sensitive sealing discs move in response to movement of said actuating nut, said method further comprising moving said actuating nut to a position where said heat sensitive sealing discs define said open position.

7. A method as in claim 3, wherein said pipe comprises metal and said sealing comprises welding.

8. A method as in claim 7, wherein said resilient, heat sensitive sealing discs move in response to movement of said actuating nut, said method further comprising moving said actuating nut to a position where said heat sensitive sealing discs define said open position.

* * * * *